United States Patent [19]

Sandlin

[11] Patent Number: 5,782,640
[45] Date of Patent: Jul. 21, 1998

[54] LANGUAGE TRANSLATION NOTE PAD

[76] Inventor: Brad A. Sandlin, 25 Dunns Ct., Stonington, Conn. 06378

[21] Appl. No.: 655,607

[22] Filed: May 3, 1996

[51] Int. Cl.$^6$ ............................................. G09B 19/08
[52] U.S. Cl. ............................................. 434/157; 283/46
[58] Field of Search ............................................. 434/156, 157, 434/159, 162, 165, 167; D19/1; 283/45, 46

[56] References Cited

U.S. PATENT DOCUMENTS

| | | | |
|---|---|---|---|
| 3,190,013 | 6/1965 | Cuttat | 283/46 X |
| 3,271,884 | 9/1966 | Robertson | |
| 4,404,764 | 9/1983 | Wills et al. | 283/45 X |
| 5,178,542 | 1/1993 | Chigrinsky et al. | |

FOREIGN PATENT DOCUMENTS

| | | | |
|---|---|---|---|
| 521784 | 7/1921 | France | 434/157 |
| 10198 | 4/1897 | United Kingdom | 434/159 |
| 12735 | 9/1908 | United Kingdom | 434/157 |
| 1578649 | 11/1980 | United Kingdom | |

*Primary Examiner*—Jeffrey A. Smith

[57] ABSTRACT

A note pad for teaching single word translations having a number of sheets of writing paper bound on a adjacent common edge with a letter of the alphabet in the upper left corner, a pictorial representation of the word in the upper right corner, a first language, phonetic spelling and word on the bottom left side and a second language, phonetic spelling and word on the bottom right side. One writes on the note pad and is taught language translations consciously or unconsciously. The phonetic spelling of the words assist the user in pronouncing the words correctly. Pictorial representation is used as a visual correspondence to the words. The pad is arranged in alphabetical order to assist in teaching the alphabet.

4 Claims, 2 Drawing Sheets

LANGUAGE TRANSLATION NOTE PAD

BACKGROUND

1. Field of Invention

This invention relates to the teaching of languages, specifically to a special note pad to teach language translations.

2. Description of Prior Art

The study of languages uses many mediums. One method is to teach single word translations. There are several devices invented to teach single word translations. Flash cards, books, and several specially designed devices teach single word translations. These devices translate words but serve no other purpose. Someone must have intent to translate words to use these devices. Additionally these devices do not have the phonetic spelling of the words to assist the user in pronouncing the translated words. For example the device in U.S. Pat. No. 3,271,884 uses single word translations with pictures but does not include phonetic spellings. It is also serves only one purpose being to translate single word translations.

OBJECTS AND ADVANTAGES

Accordingly, several objects and advantages of my invention are as follows:

(a) Incorporates language translation with everyday note pads resulting in a pad that teaches language translation. Note pads are used in our daily lives for shopping lists, phone numbers, directions, doodling, etc. Children especially like note pads to draw and color on. Using the language translation note pad the user no longer needs an intent to learn a language. They learn translations consciously or unconsciously while they use the note pads in there daily lives. Since it is a widely accepted concept that any course of study benefits from a natural method of teaching my invention has an advantage over prior art utilizing this method.

(b) Provides phonetic spellings to assist in the pronunciation of translated words.

(c) Provides an arrangement of words in alphabetical order to assist in function and teaching the alphabet.

Further objects and advantages of my invention will become apparent from a consideration of the drawings and ensuing description.

DRAWING FIGURES

Figure 1:
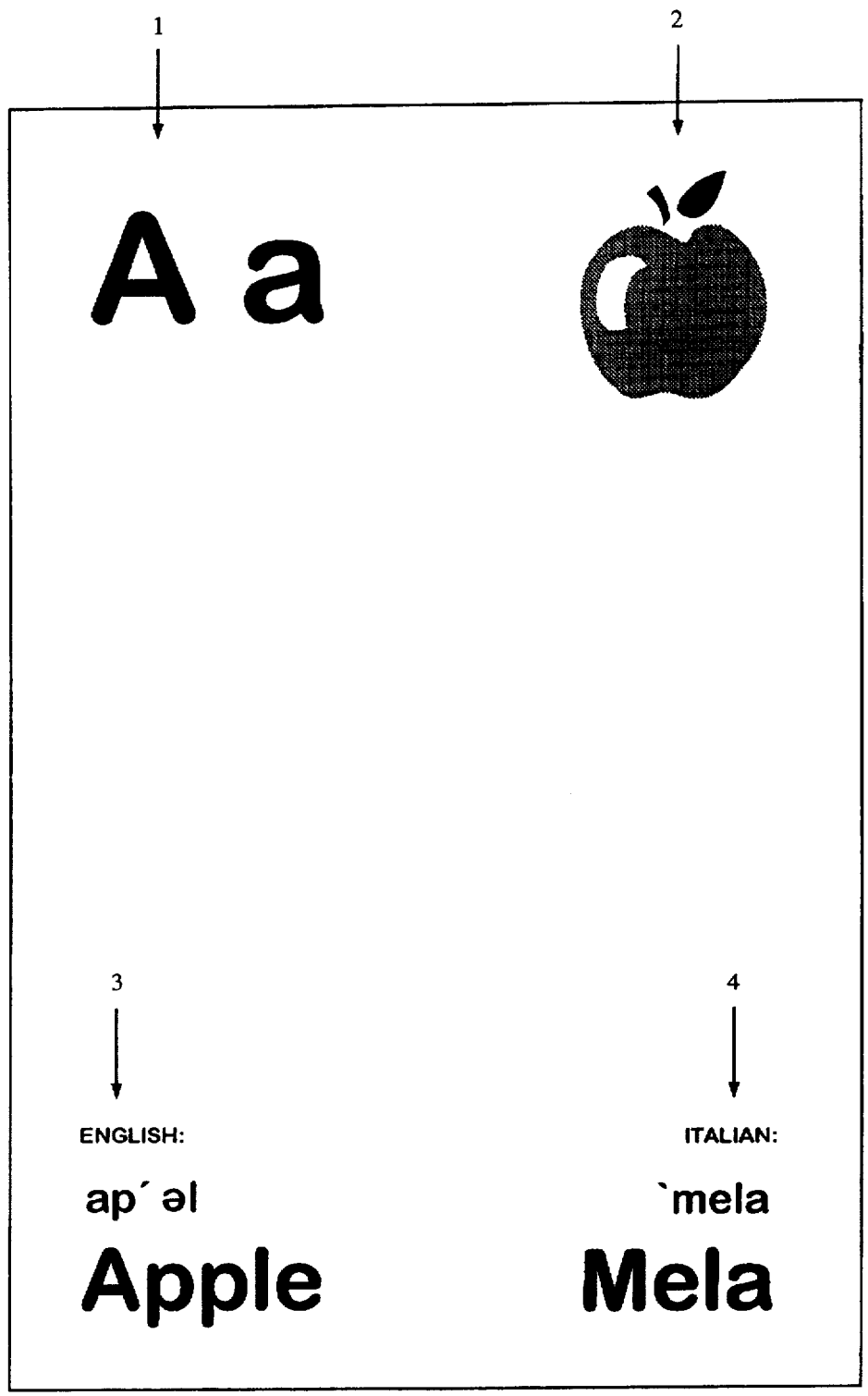
FIG. 1 shows the front view of a single page of my invention.

REFERENCE NUMERALS IN DRAWINGS 1 letter of the alphabet corresponding to first word
2 pictorial representation
3 first language, phonetic spelling, first word
4 second language, phonetic spelling, second word
5 binding
6 backing
7 detachable sheets

SUMMARY

An invention that teaches single word translations consciously or unconsciously while writing on a disposable note pad comprising of a letter of the alphabet, pictorial representation, first language, first phonetic spelling, first word, and second language, second phonetic spelling, second word. One is taught language translations while they perform writing tasks on a note pad.

DESCRIPTION—FIGS. 1 AND 2

Figure 2:
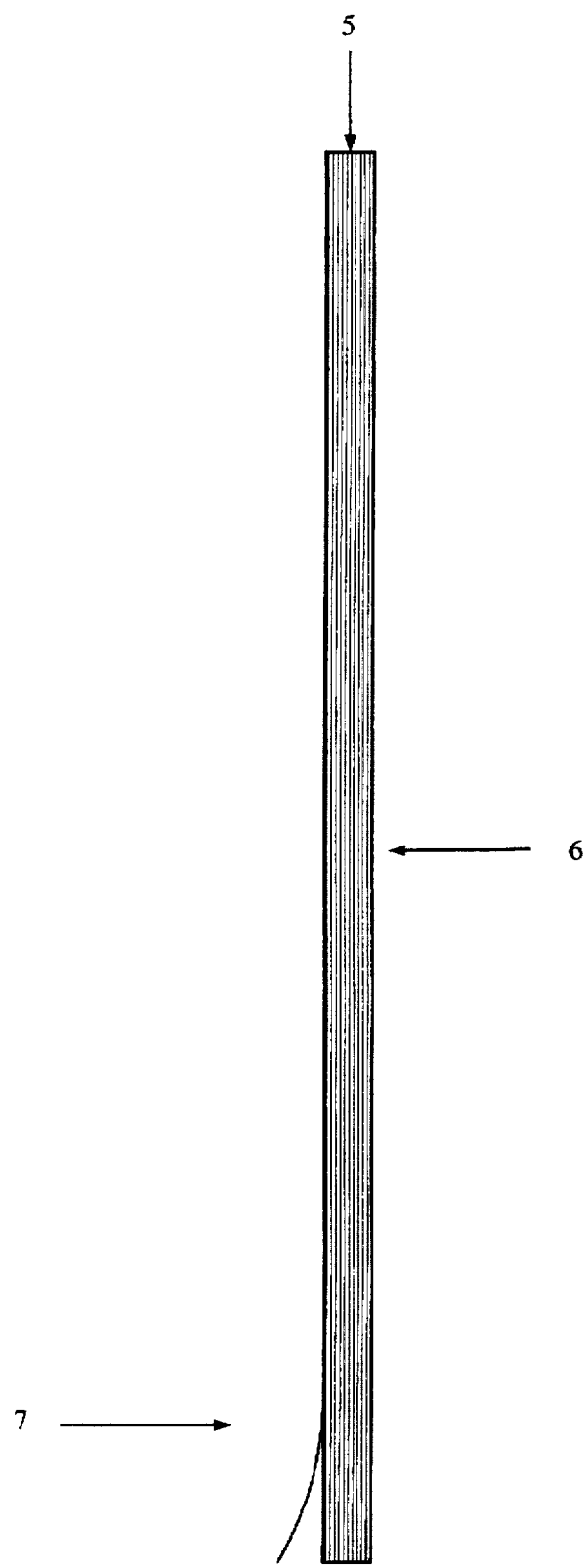
FIG. 2 shows a side view of my invention.

A typical embodiment of the language translation pad is shown in FIG. 1 (top view) and FIG. 2 (side view). FIG. 1 shows a single sheet from a language pad consisting of a letter of the alphabet 1 located in the top left corner of the sheet. A pictorial representation 2 of a word from a first language corresponding to a letter of the alphabet 1 is located at the top right corner o f the sheet. At the bottom left corner of the sheet is a first language name, phonetic spelling of first word, and first word 3 that corresponds with letter of the alphabet 1 and pictorial representation 2. A second language name, second phonetic spelling, and second word 4 is located on the bottom right of the page and is a translated word of first word 3 and also corresponds to pictorial representation 2. Additional embodiments are shown in FIG. 2 which shows a side view of the note pad where a pad of sheets are bound 5 to card backing 6. The sheets can be lifted and torn off 7 when they have been written on showing subsequent sheets with additional translated words 3 and 4 pictorial representations 2 and letters of the alphabet 1 that are placed in alphabetical order.

OPERATION—FIGS. 1 AND 2

One writes on a language translation note pad and is exposed to a letter of the alphabet corresponding to a first word 1 a pictorial representation 2 a first language, first phonetic spelling, first word 3 second language, second phonetic spelling, second word 4 during the process. While one writes on and disposes of the sheets the user is taught foreign translations and how to pronounce them. This is done consciously or unconsciously during the process. As the user tears off sheets of the note pad they will reveal subsequent sheets with additional translations on them. The sheets are arranged in alphabetical order.

SUMMARY, RAMIFICATIONS, AND SCOPE

Accordingly, the reader can see that the language translation device of the invention provides an easy and effective way to learn language translation while performing writing tasks on a note pad. The user does not need intent to translate languages to use this invention. The translations are learned consciously or unconsciously while performing writing tasks. The invention can be used by persons of almost any age. Phonetic spellings are included to teach the user proper pronunciation of words.

While my above description contains many specificities, these should not be construed as limitations on the scope of the invention, but rather as an exemplification of one preferred embodiment thereof. For example the phonetic spellings of first and second words can be removed. The invention can be used to teach other languages or concepts. The invention can be made in different sizes, shapes, and colors of ink or paper. The card backing can be imprinted with a pronunciation guide. The center of a sheet of the invention can be blank or imprinted with items associated with note pads i.e. shopping lists, things to do lists, etc.

Thus the scope of the invention should be determined by the appended claims and their legal equivalents, rather than by the examples given.

I claim:

1. A device for teaching single word translation from a first language employing a particular alphabet having an alphabetic ordering to a second, different language, said device comprising:

a pad comprising a plurality of sheets of writing paper bound together adjacent a common edge, each of said sheets having a writing surface which bears indicia, said indicia comprising:

a letter of the alphabet employed by said first language;

a first word, said first word being selected from a plurality of words employed by said first language, said first word beginning with said letter of the alphabet employed by said first language;

a second word, said second word being selected from a plurality of words employed by said second language and corresponding in meaning to said first word; and a pictorial representation corresponding in meaning to said first word and said second word;

said plurality of sheets being arranged relative to each other in an alphabetical order consistent with the alphabet ordering of said first language; and whereby a person knowing one of said first and second languages may learn the other of said first and second languages by observing the indicia borne by a particular one of said sheets during the course of writing on that particular sheet.

2. The device of claim 1, wherein said first word is selected from a plurality of words employed by said first language and commonly used while traveling;

whereby a person knowing one of said first and second languages may translate common words used while traveling.

3. The device of claim 2, wherein said indicia further comprises:

a phonetic spelling of said first word positioned proximate said first word; and a phonetic spelling of said second word positioned proximate said second word.

4. The device of claim 1, wherein said indicia further comprises:

a phonetic spelling of said first word positioned proximate said first word; and a phonetic spelling of said second word positioned proximate said second word.

* * * * *